(12) United States Patent  (10) Patent No.: US 7,792,768 B2
Naphade et al.  (45) Date of Patent: *Sep. 7, 2010

(54) COMPUTER PROGRAM PRODUCT AND SYSTEM FOR AUTONOMOUS CLASSIFICATION

(75) Inventors: Milind R. Naphade, Fishkill, NY (US); John R. Smith, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 12/205,548

(22) Filed: Sep. 5, 2008

(65) Prior Publication Data

US 2009/0037358 A1  Feb. 5, 2009

Related U.S. Application Data

(63) Continuation of application No. 10/899,857, filed on Jul. 27, 2004, now Pat. No. 7,426,498.

(51) Int. Cl.
G06F 15/18 (2006.01)
(52) U.S. Cl. .............................. 706/20; 706/12; 706/16; 706/45
(58) Field of Classification Search ............. 706/12–21, 706/45, 62
See application file for complete search history.

(56) References Cited

U.S. PATENT DOCUMENTS

| 5,701,398 A | 12/1997 | Glier et al. |
| 6,269,351 B1 * | 7/2001 | Black ........................... 706/15 |
| 7,415,445 B2 * | 8/2008 | Forman ........................ 706/20 |
| 7,440,944 B2 * | 10/2008 | Selvaraj et al. ................. 707/6 |
| 7,546,278 B2 * | 6/2009 | Yang et al. ..................... 706/20 |
| 2002/0165839 A1 | 11/2002 | Taylor et al. |
| 2003/0158828 A1 | 8/2003 | Ikeda et al. |
| 2005/0213825 A1 * | 9/2005 | Basak et al. ................. 382/224 |

OTHER PUBLICATIONS

Rijsbergen, "Information Retrieval", Butterworths, London, 2nd ed., 1979, pp. 1-3, Retrieved Oct. 26, 2007.
Jizba, "Measuring Search Effectiveness", Creighton University, 2000, pp. 1-3, Retrieved Apr. 16, 2007.
Caruana, "Performance Measures for Machine Learning", Cornell University, 2003, pp. 1-32.
Mahesh, "Text Retrieval Quality: a Primer" Oracle Corporation, pp. 1-10, Retrieved Apr. 16, 2007.

* cited by examiner

*Primary Examiner*—Donald Sparks
*Assistant Examiner*—Omar F Fernandez Rivas
(74) *Attorney, Agent, or Firm*—Yee & Associates, P.C.; Anne Dougherty

(57) ABSTRACT

An autonomous classification device which enables the creation of autonomous classifiers that are easy to deploy, adapt and optimize in the environment in which they are used. The classifier is autonomous in that it can perform three functions that define autonomic systems: automatically configure itself in an environment, optimize its performance using the environment and mechanisms for performance, and continually adapting to improve performance and heal itself in a changing environment.

20 Claims, 4 Drawing Sheets

COMPUTER PROGRAM PRODUCT AND SYSTEM FOR AUTONOMOUS CLASSIFICATION

This application is a continuation of U.S. application Ser. No. 10/899,857, filed Jul. 27, 2004 now U.S. Pat. No. 7,426,498, entitled "Method and Apparatus for Autonomous Classification."

BACKGROUND OF THE INVENTION

1. Technical Field

The present invention relates generally to the field of autonomous classification, and more specifically to enabling creation of autonomous classifiers.

2. Description of Related Art

Prior art exists in classification systems (R. O. Duda, P. E. Hart, and D. G. Stork. "Pattern Classification." Wiley, New York, 2nd edition, 2000, hereby incorporated by reference). Most classification systems go through 2 phases. The training of the classifier is conducted in supervised or semi-supervised fashion, where human input is required to train the mapping function from the input space to the decision space. In the classification phase, the classification system is presented with an input data. The classifier then uses its mapping function to produce a decision corresponding to the input. Prior art also exists in the area of autonomous management of computing infrastructure. The classifier is involved in the process of sample selection during training in a class of systems referred to as "active learners." (Naphade, Lin, Tseng, Smith and Basu, "Learning to Annotate Video Databases", SPIE Storage and Retrieval for Media Databases, January 2002, hereby incorporated by reference). In this work the authors show how the process of learning the mapping function from the input data to the decision space can be efficiently learnt if the classifier is involved in the process of sample selection.

Prior Art in the area of autonomous computing exists at the level of autonomous management of computing infrastructure as the IBM eLiza autonomic computing project which aims for self-configuring, self-healing, self-optimizing and self-protecting computing infrastructure (available on IBM's Website regarding autonomic servers); interoperability amongst low level web services such as the WSDL, or the high-level semantic interoperability for web services such as the Semantic Web (J. Handler, T Berners-Lee and E. Miller, "Integrating Applications on the Semantic Web", Journal of the Institute of Electrical Engineers of Japan, Vol 122(10), October 2002, p. 676-680, hereby incorporated by reference). The main idea of the semantic web is to extend the current world wide web in which information is given well-defined meaning, thus better enabling computers and people to work in cooperation. The main idea is to have data on the Web defined and linked such that it can be used for more effective discovery, automation, integration and reuse across various applications. The aim is to provide an infrastructure that enables services, sensors, programs and appliances to both consume and produce data on the web. New protocols and languages are being developed rapidly to standardize the ways in which systems describe what they do. An XML-based protocol called SOAP (available on the Web) has been developed to provide standard means for allowing programs to invoke other programs on the web. In addition new web service description and web service languages are emerging. While predefined service definitions may be easier to handle, discovering new services that use different descriptions may not be possible without newly emerging resources such as the web ontology language (available on the Web). There is no existing system or framework currently that actually allows autonomous classification systems.

SUMMARY OF THE INVENTION

The present invention relates to the field of autonomous classification. Classifiers are used in all fields such as engineering, technology, business, science and finances, intelligence etc. The purpose of using a classifier is mapping data into a class or category. In a preferred embodiment, this invention enables the creation of autonomous classifiers thus making them easy to deploy, adapt and optimize objective functions in the environment in which they are supposed to operate. The classifier is autonomous in that it can perform the three functions that define autonomic systems: automatically configure itself in an environment, optimize its performance using the environment and mechanisms for performance, and continually adapt to improve performance and heal itself in the face of changing environment and unexpected missing values in information sources. The present invention can make it possible for classifiers to be deployed in any system and expect it to perform its function autonomously.

BRIEF DESCRIPTION OF THE DRAWINGS

The present invention, as well as a preferred mode of use and further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
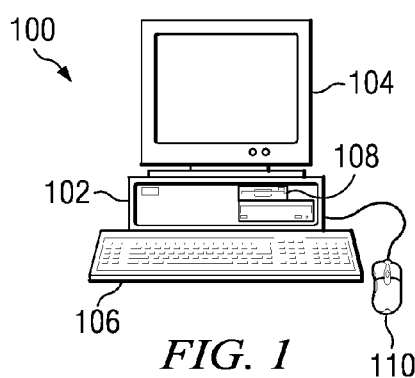
FIG. 1 shows a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
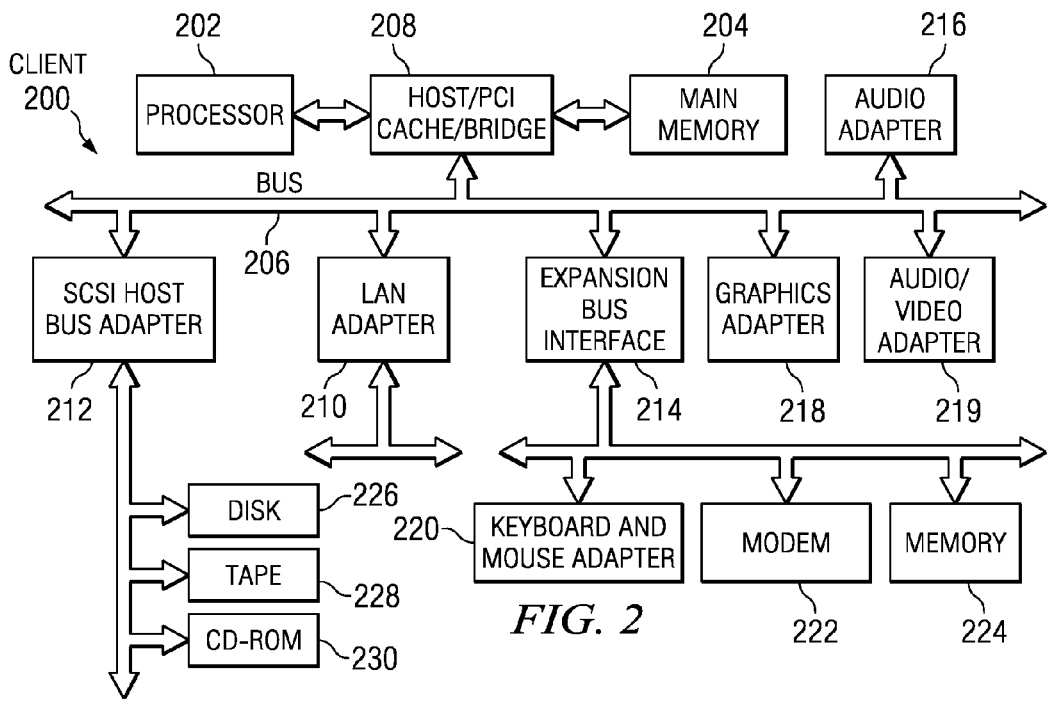
FIG. 2 shows a diagram of elements of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

In the preferred embodiment as well as in the claims, a classifier or classification device refers to a device that accepts an input data and produces an output decision using some mapping function.

This invention is related to an autonomous classification device, where the autonomy is achieved through automatic configurability, optimization and self healing. In the preferred embodiment, the automatic configurability for the classification device implies the ability of the classification device to configure itself in the environment in which it is expected to operate, configure itself in terms of its operating characteristics based on the requirement of the environment. The continuous optimization of a classification device in the preferred embodiment is achieved through the use of an intrinsic training corpus and evaluation function in conjunction with any extrinsic inputs and supervision provided by the environment and the continuous optimization optimizes a value function such as precision or recall or average precision. The selfhealing ability in the preferred embodiment translates into a proactive interaction device that analyzes the autonomous classification device, figures out where and how the classification device is providing inaccurate Outputs, or the situation where the mapping function needs to be updated to heal and protect its integrity in terms of performance measure, and is able to proactively seek assistance and guidance from the environment to thus heal itself. We now describe the preferred embodiment using FIGS. 1-7.

Figure 3:
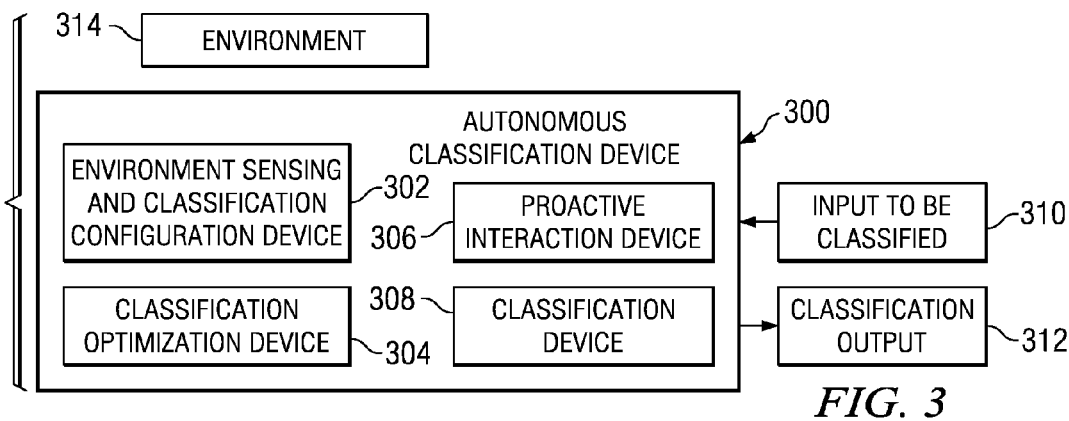
FIG. 3 shows an autonomous classification device according to a preferred embodiment of the present invention.

FIG. 3 shows autonomous classification device 300. The components of autonomous classification device 300 consists of environment sensing and classification configuration device 302, classification optimization device 304, proactive interaction device 306 and classification device 308. Autonomous classification device 300 operates in an environment with which it interacts and converts input to be classified 310 into an output 312 that is a decision. The purpose of environment sensing and classification configuration device 302 is to communicate the classification input and output format with the environment 314, set the configuration of autonomous classification device 300 in congruence with the requirements from the environment. In the preferred embodiment this is done through standard based description of the input, and output definition of the classification device. For example in a preferred embodiment, the classification device could receive as input a 166 dimensional color histogram feature for image classification and the output could be a 3 dimensional feature.

Figure 4:
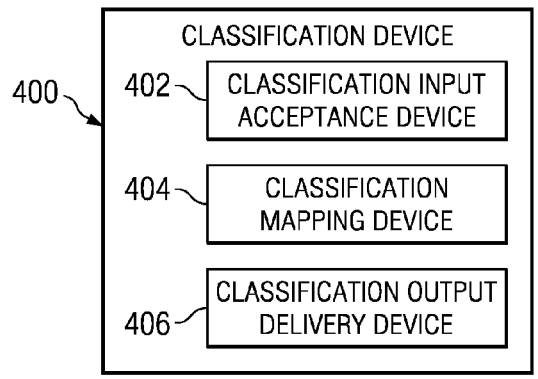
FIG. 4 shows a classification device consistent with a preferred embodiment of the present invention.

FIG. 4 shows classification device 400. It consists of three components, classification input acceptance device 402, classification mapping device 404 and classification output delivery device 406. In a preferred embodiment mapping device 404 could be learnt or provided by the user. Also mapping device 404 could be a lookup table or a functional form of the input into the output.

Figure 5:
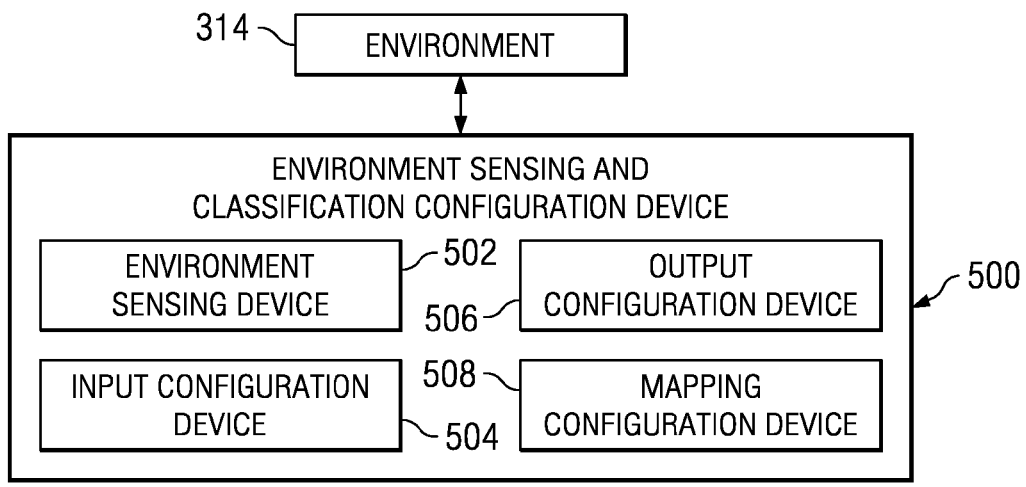
FIG. 5 shows an environment sensing and classification configuration device consistent with a preferred embodiment of the present invention.

FIG. 5 shows environment sensing and classification configuration device 500, which consists of environment sensing device 502, input configuration device 504, output configuration device 506 and mapping configuration device 508. The environment sensing and classification configuration device interacts with environment 314 to decide how it should operate and how it should automatically configure itself given the environment.

Figure 6:
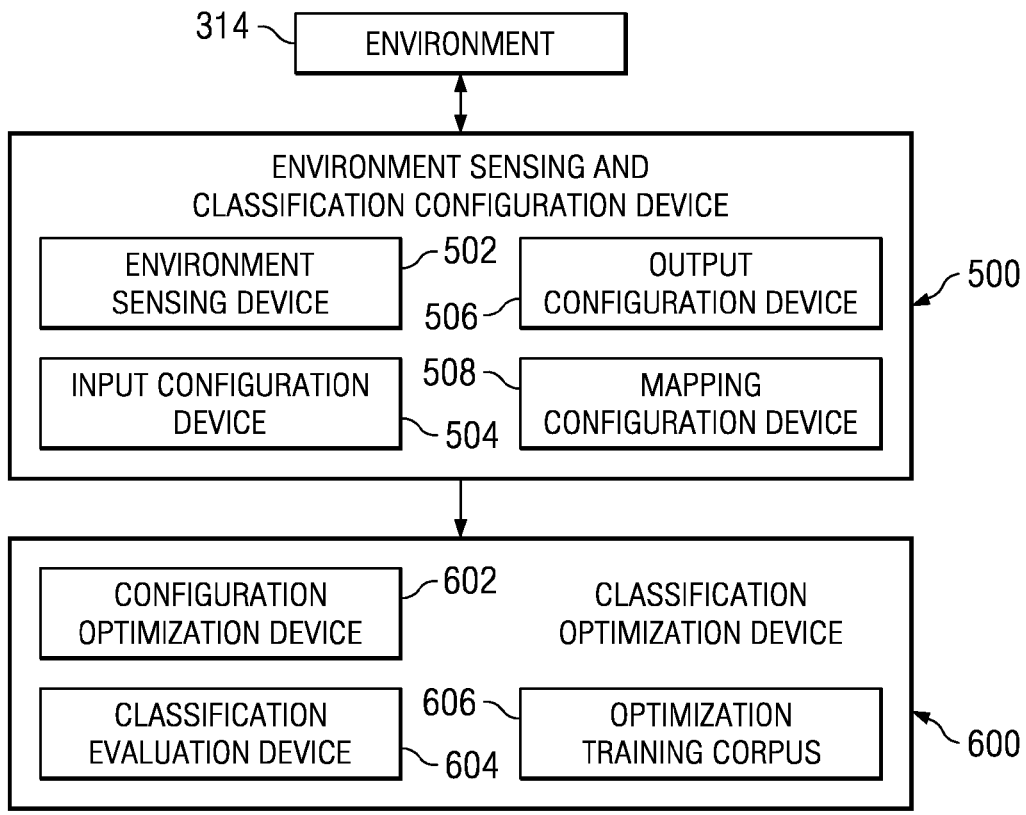
FIG. 6 shows a classification optimization device consistent with a preferred embodiment of the present invention.

FIG. 6 shows classification optimization device 600, which consists of configuration optimization device 602, classification evaluation device 604 and optimization training corpus 606 that is used by classification optimization device 606 to optimize classification performance over the input, mapping and output configurations of the classification device and the optimization is validated using the classification evaluation device 604. In a preferred embodiment the configuration of one or more of the input device, output device and the mapping device could be parametric and the adjustment in the process of autonomous behavior could adjust the parameters of the device(s). In a preferred embodiment the self optimization performed by classification optimization device 600 would adjust the parameters of the input, output and mapping device to achieve optimal performance as measured over some goodness metric or function that is calculated by the evaluation device.

Figure 7:
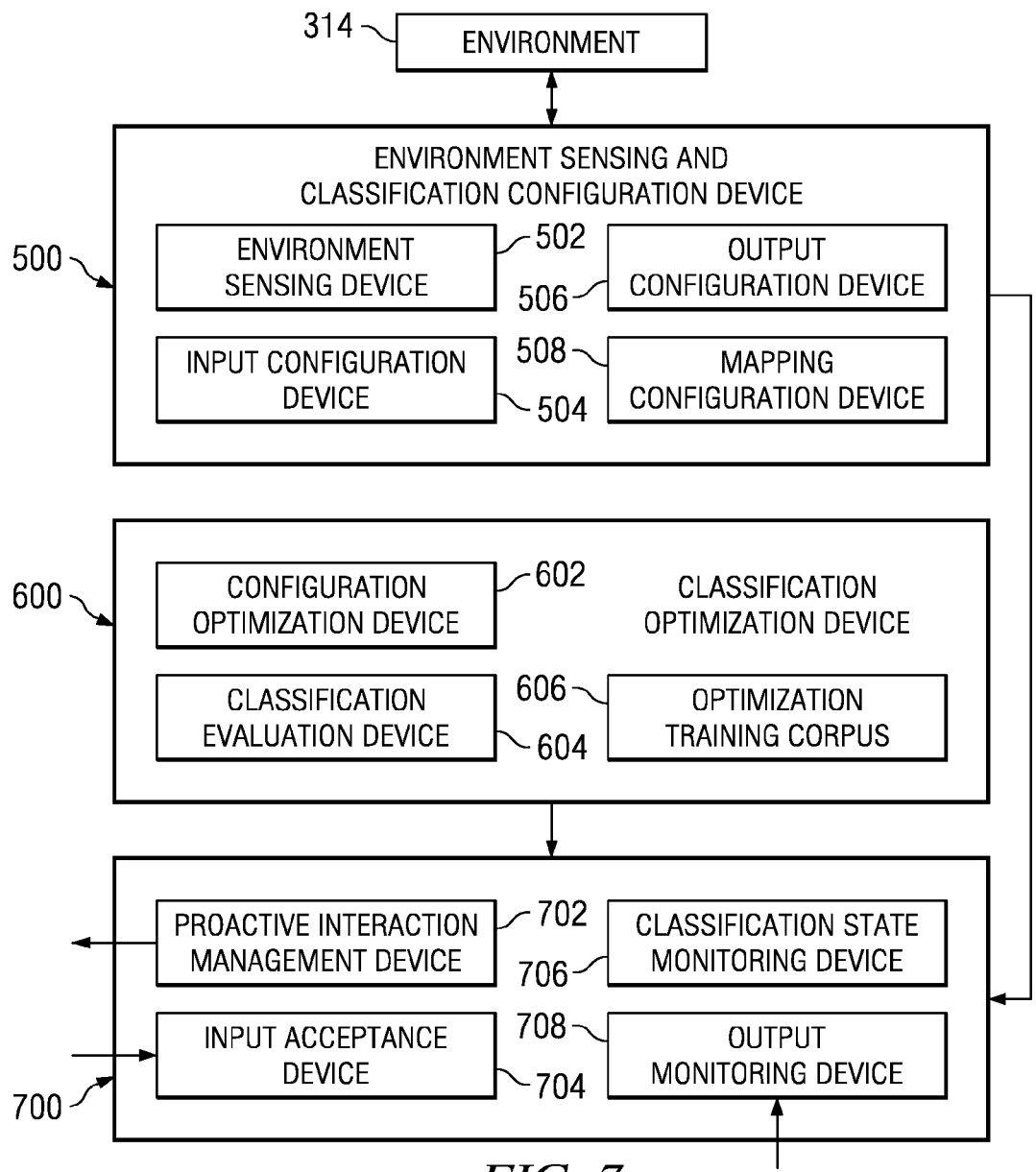
FIG. 7 shows a proactive interaction device consistent with a preferred embodiment of the present invention.

FIG. 7 shows proactive interaction device 700 which consists of proactive interaction management device 702, input acceptance device 704, classification state monitoring device 706 and output monitoring device 708. In a preferred embodiment the self healing activities of the autonomous classification device 300 is performed by the proactive interaction device 306 which uses the classification device 308, the evaluation device (which evaluates the current classifier and determines how well the classifier is doing in terms of its performance measures) and a proactive interaction management device 306 to seek input/guidance from the environment so as to adapt, improve its performance, correct its errors of configuration, performance and in general heal itself.

Figure 8:
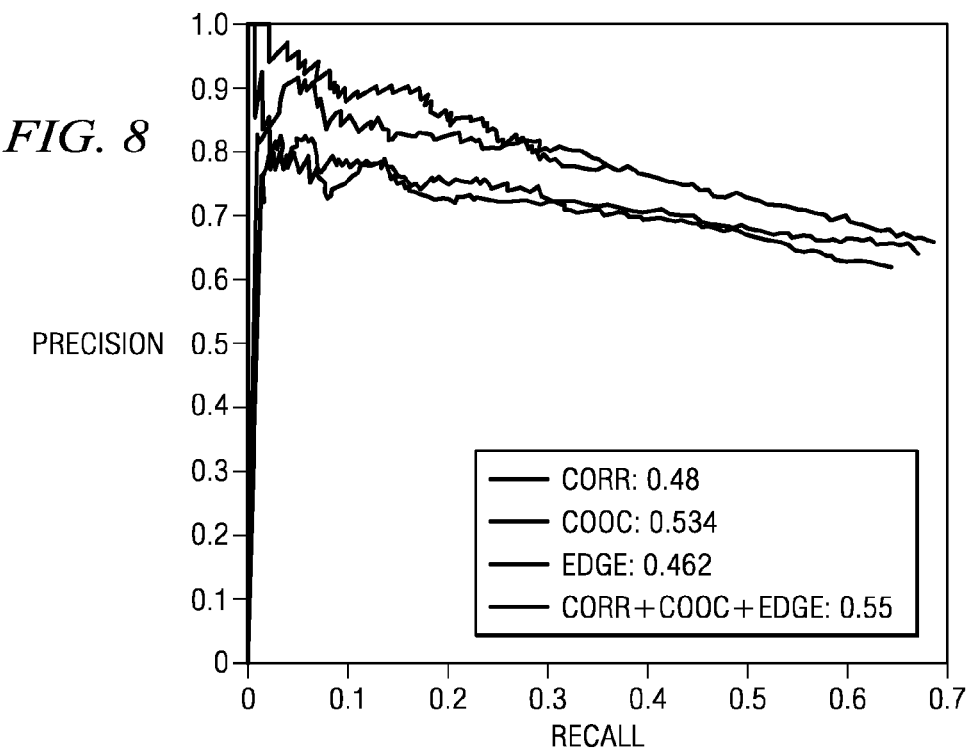
FIG. 8 shows a precision recall curve that can be used to configure the autonomous classification device consistent with a preferred embodiment of the present invention.

FIG. 8 shows a precision recall curve that can be a performance characterization method that in a preferred embodiment can be used to configure the autonomous classification device at a particular operating point on the curve based on the requirement of the environment. The same performance characterization method is something that could be optimized by the classification optimization device. Finally this performance characterization of the device could be used by the proactive interaction device to seek input from the environment and in the preferred embodiment could be the measure that the self healing process of the proactive interaction device is trying to improve. The self configuration can be performed by using the operating characteristics curves which in a preferred embodiment could be a precision recall curve. The environment could cause the autonomous classification device to operate at a particular operating characteristic in terms of precision and recall.

Figure 9:
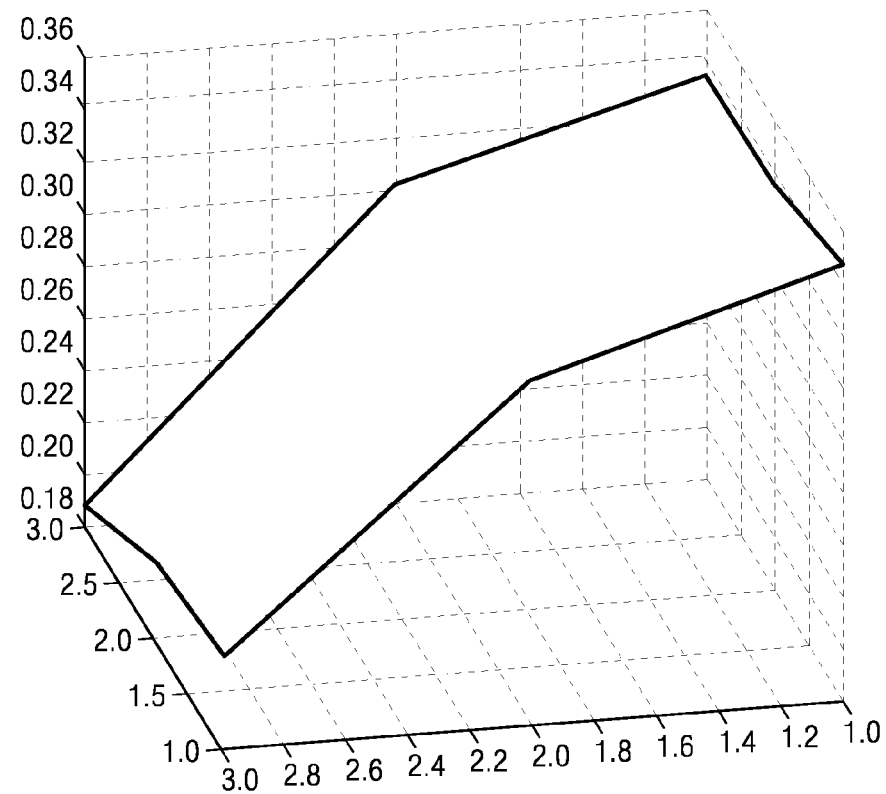
FIG. 9 shows a plot of a goodness of measure of the mapping function consistent with a preferred embodiment of the present invention.

FIG. 9 shows the plot of a goodness measure of the mapping function plotted as a function of the parameters of the mapping function. The classification optimization device could optimize the device operation over input, output and mapping parameters by creating such performance characteristics to calibrate the classification device and then consulting the calibration for self optimization, automatic configuration and healing. For example, in a preferred embodiment the two dimensions could be two different features and the manifold shown in the FIG. 7 is the goodness measure obtained using the classification evaluation device. Based on this the autonomous performance functions (self configuration, self optimization and self healing) can act. The environment could cause the self configuration of the autonomous classification device to figure out that of the 2 features using the system only one is available and hence the operating characteristics or calibration curves could be used by the device to change the operating point on the curve from the configuration which is optimal for 2 features to the configuration which is optimal for the available feature. The self optimization can be performed by selecting the operating point in FIG. 7 that leads to the highest value of the goodness function. The self healing can be performed by attempting to seek environment input to improve the values of the goodness function at selected operating points.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for autonomous classification, the computer program product comprising:
   a computer readable recordable-type media having computer executable instructions stored thereon, the computer executable instructions comprising:
   computer executable instructions for inputting data to an autonomous classifier, wherein the autonomous classifier is a deployed autonomously operating device;
   computer executable instructions for communicating classification input and output format information with an external environment using environment sensing;
   computer executable instructions for proactively seeking assistance and guidance from the external environment;
   computer executable instructions for self-configuring, self-optimizing and self healing the autonomous classifier using extrinsic inputs of the external environment and a goodness measure;

computer executable instructions for selecting an operating point on a precision recall curve using a requirement of the external environment;
computer executable instructions for configuring the autonomous classifier using the operating point on the precision recall curve and the goodness measure;
computer executable instructions for outputting a decision by the autonomous classifier, wherein the decision is based on a mapping function that operates on input data; and
computer executable instructions for storing the decision in memory.

2. The computer program product of claim 1, wherein computer executable instructions for self-configuring, self-optimizing and self healing the autonomous classifier using extrinsic inputs of the external environment further comprises:
computer executable instructions for self description of input and output and mapping, self description of parameters, and self generation and consultation of performance in terms of inputs, output, and mapping of the autonomous classifier.

3. The computer program product of claim 1, wherein computer executable instructions for self-configuring, self-optimizing and self healing the autonomous classifier using extrinsic inputs of the external environment further comprises:
computer executable instructions for autonomous evaluation of classification performance in the external environment in which the autonomous classifier is introduced combined with computer executable instructions for an autonomous ability to optimize system performance based on inputs provided to the autonomous classifier and a required output.

4. The computer program product of claim 1, wherein wherein computer executable instructions for self-configuring, self-optimizing and self healing the autonomous classifier using extrinsic inputs of the external environment further comprises:
computer executable instructions for an autonomous evaluation of classification performance in terms of inputs, outputs, and mapping;
computer executable instructions for an autonomous decision based on the quantity and nature of input solicited from the external environment; and
computer executable instructions for an autonomous ability to optimize the system performance based on input provided to the autonomous classifier.

5. The computer program product of claim 1, wherein computer executable instructions for outputting a decision by the autonomous classifier wherein the decision is based on a mapping function that operates on input data further comprises:
computer executable instructions for accepting the input data and mapping the input data to an output decision.

6. The computer program product of claim 5, wherein computer executable instructions for self-configuring, self-optimizing and self healing the autonomous classifier using extrinsic inputs of the external environment further comprises:
computer executable instructions for describing in a standardized method, input features of the autonomous classifier, output decisions of the autonomous classifier, and parameters of the autonomous classifier.

7. The computer program product of claim 5, wherein computer executable instructions for self-configuring, self-optimizing and self healing the autonomous classifier using extrinsic inputs of the external environment further comprises:
computer executable instructions for self-optimization by validating performance of the autonomous classifier using a provided corpus of inputs and outputs.

8. The computer program product of claim 5, wherein computer executable instructions for self-configuring, self-optimizing and self healing the autonomous classifier using extrinsic inputs of the external environment further comprises:
computer executable instructions for self-healing by validating performance of the autonomous classifier using a provided corpus of inputs and outputs.

9. The computer program product of claim 5, further comprising:
computer executable instructions for the autonomous classifier to publish performance as a function of parameters associated with the autonomous classifier.

10. The computer program product of claim 1 further comprising:
computer executable instructions for optimizing the precision recall curve using a classification optimization device.

11. The computer program product of claim 1 further comprising:
computer executable instructions for healing the autonomous classifier using a proactive interaction device to improve the precision recall curve.

12. A system for autonomous classification, comprising:
a bus;
a main memory in communication with the bus, wherein the main memory contains computer executable instructions stored therein;
a processor in communication with the bus;
an autonomous classification device, wherein the autonomous classification device is a deployed autonomously operating device in communication with the bus, and wherein the processor executes the computer executable instructions to direct the autonomous classification device to configure itself, optimize itself, and heal itself with respect to an external environment;
an environment sensing and classification configuration device in communication with the bus, wherein the processor executes the computer executable instructions to direct the environment sensing and classification configuration device to use information on a precision recall curve and a goodness measure to configure the autonomous classification device;
a proactive interaction device in communication with the bus to proactively seek assistance and guidance from an external environment;
a classification input acceptance device in communication with the bus and the external environment using environment sensing;
a classification mapping device in communication with the bus; and
a classification output delivery device in communication with the bus and the external environment.

13. The system of claim 12, wherein the processor executes the computer executable instructions to direct the data processing system to self configure the autonomous classification device by self description of input and output and mapping, self description of parameters, and self generation and consultation of performance in terms of inputs, output, and mapping of the autonomous classifier.

14. The system of claim 12, wherein the processor executes the computer executable instructions to direct the data processing system to self optimize the autonomous classification device by autonomous evaluation of classification performance in the environment in which the autonomous classification device is introduced combined with an autonomous ability to optimize system performance based on inputs provided to the autonomous classification device and a required output.

15. The system of claim 12, wherein the processor executes the computer executable instructions to direct the data processing system to self heal of the autonomous classification device by:
- an autonomous evaluation of classification performance in terms of inputs, outputs, and mapping;
- an autonomous decision based on the quantity and nature of input solicited from the environment; and
- an autonomous ability to optimize the system performance based on input provided to the autonomous classification device.

16. The system of claim 12, wherein the processor executes the computer executable instructions to direct the data processing system for the autonomous classification device to accept an input data and map the input data to an output decision.

17. The system of claim 16, wherein the processor executes the computer executable instructions to direct the data processing system to automatically configure the autonomous classification device by describing in a standardized method input features of the autonomous classification device, output decisions of the autonomous classification device, and parameters of the autonomous classification device.

18. The system of claim 16, wherein the processor executes the computer executable instructions to direct the data processing system for the autonomous classification device to perform self-optimization by validating performance of the autonomous classification device using a provided corpus of inputs and outputs.

19. The system of claim 12 wherein the processor executes the computer executable instructions to direct the data processing system for the environment sensing and classification configuration device to optimize the precision recall curve using a classification optimization device.

20. The system of claim 12 wherein the processor executes the computer executable instructions to direct the data processing system for the
- proactive interaction device used to heal the autonomous classifier by improving the precision recall curve.

* * * * *